United States Patent

Lomp

(10) Patent No.: US 9,264,082 B2
(45) Date of Patent: Feb. 16, 2016

(54) SYSTEM AND ALGORITHM FOR MULTIPATH MITIGATION

(71) Applicant: BAE Systems Information And Electronic Systems Integration Inc., Nashua, NH (US)

(72) Inventor: Gary R. Lomp, Centerport, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 35 days.

(21) Appl. No.: 13/914,691

(22) Filed: Jun. 11, 2013

(65) Prior Publication Data

US 2013/0329840 A1 Dec. 12, 2013

Related U.S. Application Data

(60) Provisional application No. 61/689,757, filed on Jun. 11, 2012.

(51) Int. Cl.
| | | |
|---|---|---|
| H03D 1/06 | (2006.01) | |
| H03D 11/04 | (2006.01) | |
| H03K 5/01 | (2006.01) | |
| H03K 6/04 | (2006.01) | |
| H04B 1/10 | (2006.01) | |
| H04L 7/00 | (2006.01) | |
| H04L 25/08 | (2006.01) | |

(52) U.S. Cl.
CPC .................................. *H04B 1/1081* (2013.01)

(58) Field of Classification Search
CPC ....... H04B 1/7115; H04B 1/712; H04B 25/08
USPC ............. 375/348, E1.032, 144, 148, 150, 349
See application file for complete search history.

(56) References Cited

U.S. PATENT DOCUMENTS

| | | | | |
|---|---|---|---|---|
| 6,493,381 | B1 * | 12/2002 | Werner ............... | H04L 25/0305 375/230 |
| 6,563,859 | B1 * | 5/2003 | Oishi .................. | H04L 27/2647 375/148 |
| 7,693,210 | B2 * | 4/2010 | Margetts et al. ............... | 375/150 |
| 2003/0026326 | A1 * | 2/2003 | Jayaraman ........... | H04B 1/7115 375/148 |
| 2006/0171451 | A1 * | 8/2006 | Pietraski et al. ............... | 375/232 |
| 2007/0104254 | A1 * | 5/2007 | Bottomley et al. ........... | 375/148 |
| 2008/0063045 | A1 * | 3/2008 | Cozzo et al. ................... | 375/238 |
| 2008/0095141 | A1 * | 4/2008 | Kong et al. .................... | 370/345 |
| 2008/0232438 | A1 * | 9/2008 | Dai et al. ....................... | 375/148 |
| 2010/0020854 | A1 * | 1/2010 | He ......................... | H04B 1/712 375/148 |
| 2010/0215132 | A1 * | 8/2010 | Jonsson et al. ................ | 375/346 |

* cited by examiner

*Primary Examiner* — Shuwang Liu
*Assistant Examiner* — Sung Ahn
(74) *Attorney, Agent, or Firm* — Sand & Sebolt; Joseph A. Sebolt; Daniel J. Long (57) ABSTRACT

A system and method for optimally combining multi-path signals is presented. A first signal is received that traveled a first path from a transmitter to a receiving location and a second signal is received that traveled a different second path from the transmitter to the same receiving location. The paths are different so that the first and second signals contain the same signal data but the first signal has a first distortion that is different than a second distortion in the second signal. According to an objective function, the method adaptively generates a first weight value and a second weight value. The first and second weight values are applied to the respective first and second signals to produce respective first and second weighted signals. The first and second weighted signals are linearly combined producing a combined signal with a combined signal degradation.

22 Claims, 4 Drawing Sheets

SYSTEM AND ALGORITHM FOR MULTIPATH MITIGATION

CROSS REFERENCE TO RELATED APPLICATION

This application claims priority from U.S. Provisional Application Ser. No. 61/689,757, filed Jun. 11, 2012; the disclosure of which is incorporated herein by reference.

BACKGROUND

1. Field of Invention

The current invention relates generally to apparatus, systems and methods for communicating. More particularly, the apparatus, systems and methods relate to wireless communication. Specifically, the apparatus, systems and methods provide for improved reception of signals by analysing two or more signals at the same time and dynamically weighting the signals to product a better resulting signal.

2. Description of Related Art

In digital radio communication systems a signal is transmitted from a transmitting antenna to a receiving antenna via a channel, which channel comprises open space generally containing objects such as the earth and its topographic features (mountains, oceans) as well as buildings, vehicles and other man-made obstructions, in addition to atmospheric gases, that is characterized by several parameters and effects. The primary result of propagation through the channel is an expansion of the signal wave-front (energy) in and along multiple directions, including directions other than the nominally desired direction corresponding to a path between the receiver and transmitter.

The use of antennas having directivity (radiation patterns) reduces the propagation (respectively collection) of energy in (respectively, from) undesired directions. However, as is well known, significant energy can reach the receiving antenna after traveling along paths other than the direct path between the transmitter and receiver. Indeed, in some applications the direct path, also referred to as the line-of-sight path, may not exist at all and the received energy is actually carried by a superposition of waves that have been reflected, refracted and generally scattered during propagation.

The multiplicity of propagation paths and resulting effects on the output of the receiving antenna is referred to as "multipath". The effects of multipath are determined by the linear superposition (addition) of the multiple electromagnetic waves (or more precisely, electromagnetic fields) at the receiver antenna. This superposition can result in partial cancellation of the received field at the antenna and thus a reduction in received signal energy. This is the well-known and familiar fading process.

In addition, when the respective components of the multipath ensemble arrive at the antenna with distinct time delays (that is, having traversed different path lengths and thus having different propagation times), the components combine in a manner that may result in distortion of the signal. This is also a well-known phenomenon known as frequency selective fading, a term that arises from an analysis of the effect of the differential propagation delays of the respective waves (dispersion) in the frequency domain. What is needed is a better why of receiving multipath signals.

SUMMARY

The preferred embodiment of the invention is a method for optimally combining multi-path signals. The method begins by receiving a first signal that traveled a first path from a transmitter to a receiving location and receiving a second signal that traveled a second path from the transmitter to the same receiving location. The second path is different than the first path so that the first signal contains signal data and has a first distortion that is different than a second distortion in the second signal. The second signal contains the same signal data as the first signal. The first distortion and the second distortion can correspond to different time intervals of the signals or other parameters.

According to an objective function, the method adaptively generates a first weight value and a second weight value. The first weight value the second weight value can generate the weight values so that a combined signal to noise ratio (SNR) of the combined signal (introduced below) is maximized. The first weight value is applied to the first signal to produce a first weighted signal. Similarly, the second weight value is applied to the second signal to produce a second weighted signal.

The first weighted signal and the second weighted signal are linearly combined, to produce a combined signal with a combined signal degradation. The combined signal degradation is less than the first degradation and the combined signal degradation is less than the second degradation.

Another configuration of the preferred embodiment is a system for optimally combining multi-path signals. The system includes a first channel sub-processor logic, a second channel sub-processor logic, an objective function and adaption and combining logic. The first channel sub-processor logic receives a first signal that traveled a first path from a transmitter to the first channel sub-processor. The first signal contains signal data and has a first distortion. The second channel sub-processor logic receives a second signal that traveled a second path from a transmitter to the first channel sub-processor. The second path is different than the first path the second signal contains the same signal data and has a second distortion that is different than the first distortion.

The adaption and combining logic adaptively generates according to the objective function a first weight value and adaptively generates according to the objective function a second weight value. The first channel sub-processor logic applies the first weight value to the first signal to produce a first weighted signal. Similarly, the second channel sub-processor logic applies the second weight value to the second signal to produce a second weighted signal. The adaption and combining logic linearly combines the first weight signal and the second weighted signal to produce a combined signal with a combined signal degradation. The combined signal degradation is less than the first degradation and the combined signal degradation is less than the second degradation.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Before referring to specific figures below, the preferred embodiment of an algorithm to more accurately receive and detect multipath signals will be described. When there are multiple receiving antennas available for reception of the signal of interest there is an opportunity to realize a significant improvement in system performance by optimally combining the respective antenna outputs. It is customary to refer to the respective receiving antennas and corresponding sub-channels (propagation paths) by which energy reaches them as diversity "branches" in recognition of the fact that the impairment (fading or dispersion) on the different branches is usually uncorrelated from branch to branch, or at least not strongly correlated, resulting in a diversification of the signal quality that reduces the probability of a simultaneously poor signal condition at all branch outputs. More specifically, when the multiple antenna outputs exhibit distinct fading characteristics, as is usually the case, one may apply weights to the respective antenna outputs and then combine (add) them together so as to maximize the signal level of the weighted sum relative to the combined noise. Since the desired signal and the corresponding noise in each branch (at each antenna) receives the same weight it is necessary to choose the weights so that they optimize the signal output while controlling the noise output level in some manner. In particular, as is well known, it is desirable to maximize the signal-to-noise ratio (SNR) of the composite weighted combination of the multiple branch outputs. If the signals from the respective antennas also exhibit temporal (time domain) distortion (frequency selective fading) one may further process the respective antenna output signals with appropriate filters that are adapted to compensate for the distortion before performing the weighted combining. This more general case subsumes the pure weighted combining as a special case. In either case, the result of combining the respective antenna output signals is to mitigate the effect of multipath. Increases in radio link margin, or range, are thereby realized.

It is also to be noted that the algorithm for adaptation and optimization of the composite signal-to-noise ratio at the output of a diversity combiner is not limited in its applicability to the case of antenna (spatial) diversity. It is also applicable to systems in which the diversity branches are realized by other physical mechanisms that produce multiple signal outputs that exhibit a diversity of qualities (as measured, for example, by the respective branch signal-to-noise ratios) and which are available for weighted combining. Such multiplicity of signals may be realized, for example, by transmitting the signal on two or more distinct radio carrier frequencies (frequency diversity) or in different time intervals (time diversity). In all cases the objective is to adapt the weighting that is applied so as to maximize the combined signal quality. It is further a desirable feature of all such diversity combining systems to be able to track the relative quality of the respective branches and to control the weighting process in a manner that corresponds to the tracked relative qualities.

Figure 1:
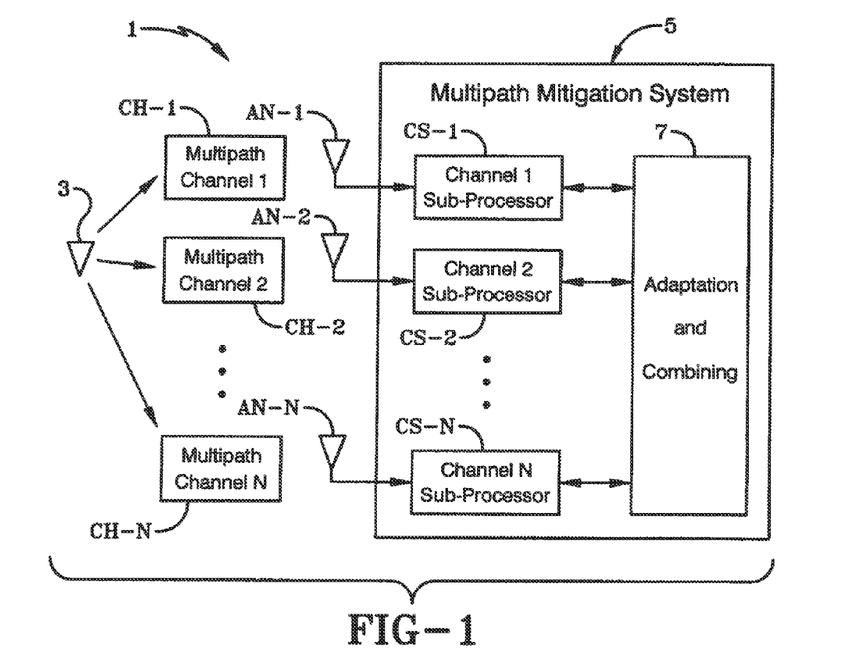
FIGS. 1 and 2 are schematic drawings illustrating a preferred embodiment of a system model of the preferred embodiment.

FIG. 1 illustrates the preferred embodiment of a system 1 that can process signals transmitted by a single transmitter and received from different paths (multipath signals) that have different distortion (impairment, addition of noise, the reduction or amplification of signal level, the time domain distortion of the signal or other degradation). However, each multipath signal carries the same signal data. For example, a transmitter 3 can transmit a signal along different channels CH1, CH2 . . . CHN as illustrated. Signal on the channels CH-1, CH-2 . . . CH-N can arrive at their respective antennas AN-1, AN-2 . . . AN-N at different times, with different phases and/or with other different properties. The signals are then processed by a multipath mitigation logic 5. Each signal from each antenna AN-1, AN-2 . . . AN-N is processed in a respective channel sub-processor logic CS-1, CS-2 . . . CS-N. As discussed in detail later, the channel sub-processor logics CS-1, CS-2 . . . CS-N can apply weight values to their corresponding signals to so as to maximize the signal quality when two or more of the signals output from the channel sub-processor logics CS-1, CS-2 . . . CS-N are combined by an adaption and combining logic 7. Maximizing the signal data quality increases the chances that the useful signal data that was originally transmitted is recovered. As discussed in detail below, the adaption and combining logic 7 runs an algorithm that determines each of the weights to be applied to the signals being processed by each of the channel sub-processor logics CS-1, CS-2 . . . CS-N.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Figure 2:
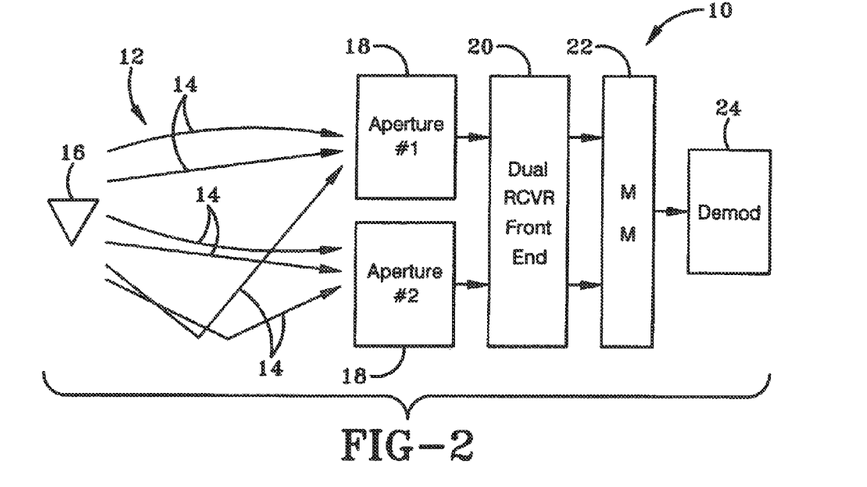

FIG. 2 illustrates and example system 10 that has two diversity branches. This system includes a propagation channel 12 and respective sub-channels (paths) 14 by which energy propagates between the transmitter 16 and the two receiving antenna apertures 18. It will be clear to one of ordinary skill in the art that the specific realization of the respective receiving antennas can take many different forms all of which provide a means of collecting signal energy and providing an output corresponding to the respective branch. As described above, the diversity branches may also be realized by other physical means. In the following detailed description it is assumed that there are two branches and that the fading condition and additive noise in the two branches are statistically independent. This is a generally occurring scenario. However, as will be understood by those of ordinary skill in the art, neither the fading/multipath processes nor the noise processes are required to be uncorrelated or independent in order for the system to provide a benefit. Also, two channels are chosen for ease of explanation and in other embodiments more than two channels may be used.

The system 10 further includes a dual receiver front end 20 and a multipath mitigation logic 22 similar to the multipath mitigation logic 5 of FIG. 1. The system 10 can include a demodulator 24 that can be used to recover the original signal.

Figure 3:
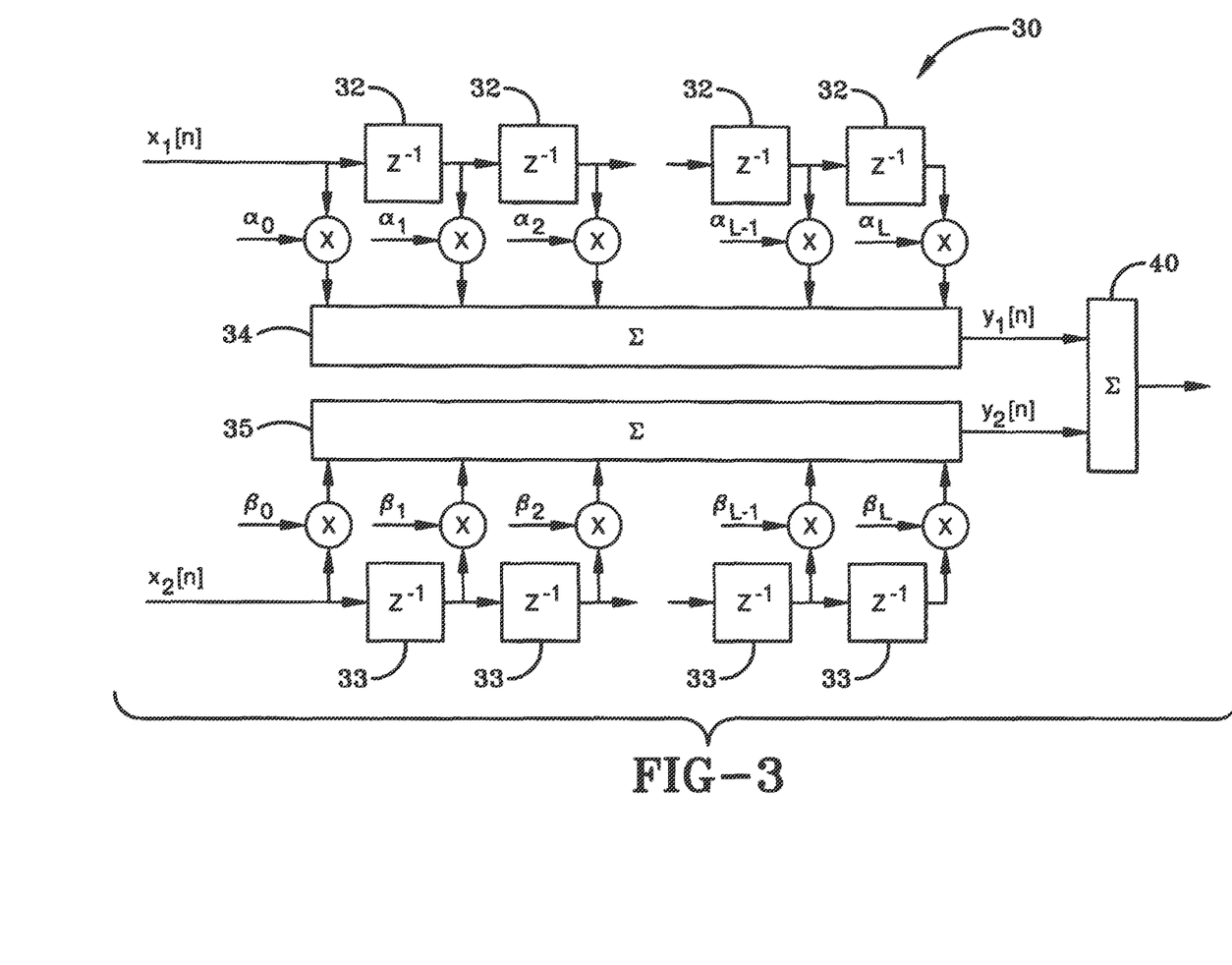
FIG. 3 is a schematic drawing showing a configuration of the preferred embodiment system in which top weights are adjusted to maximize the quality of combined output.

FIG. 3 illustrates another multipath mitigation system 30 that illustrates one configuration of the preferred embodiment of a multipath mitigation system. In particular, this figure illustrates example components use to add weights to different multipath signals using taps as understood by one of ordinary skill in the art. Signals $x_1$ and $x_2$ are received (for example at two different antennas) from to different paths so that one signal has one or more different properties (phase change, delay, etc.) that the other signal but both signals carry the same information. These signals can be complex baseband samples from the two (in this example) branches. The noise processes are denoted by $w_1$ and $w_2$.

Each signal respectively is weighted by a weight $\alpha_0$ and $\beta_0$ by using multipliers as shown. If other weights are desired then the signals can also be passed through delay elements 32, 33 and additional weights $\alpha_1 \ldots \alpha_L$ and $\beta_0 \ldots \beta_L$ can be added. In operation, the tap weights are to be adjusted to maximize the quality of the combined output according to certain metrics as discussed below. The weighted signals are input to filters 34, 35 that can be equalizer filters. The filtered signals $y_1[n]$, $y_2[n]$ are then combined in a diversity combiner 40

The embodiment of FIG. 3 runs an adaptation algorithm based on a set of norms that can be defined independently of the data-specific signal (since the latter is not demodulated). One such measure is $$P_0 = \|y_1 - y_2\|$$

This measure is related to the objective function which is simply the output SNR, which is maximized by driving $\|y_1 + y_2\|$ toward a maximum while holding the noise power constant. A direct maximization of the output SNR is described later.

Minimization of $\|y_1 - y_2\|$ will drive the two equalized signals toward a match. Of course, it may be necessary to ensure the matched value is not zero. In addition, except for the single tap (L=0) case, the signals must also be driven toward their distortion-free characteristics. For the first, it is sufficient to constrain the equalizer tap weight vector to a fixed non-zero norm. This will be discussed further below. For the second, to equalize (and prevent) any distortion of the signal components, the system 30 can attempt to match the spectral characteristics of the signal to the nominal characteristics of the undistorted signal. This may be done by correlation matching, as follows.

Define the autocorrelations $$\rho_k^{(1)} = \langle y_n^{(1)} \overline{y_{n+k}^{(1)}} \rangle$$

$$\rho_k^{(2)} = \langle y_n^{(2)} \overline{y_{n+k}^{(2)}} \rangle$$

and cross correlations $$\gamma_k = \langle y_n^{(1)} \overline{y_{n+k}^{(2)}} \rangle$$

The angle bracket notation denotes an average. As is well known, there are several types of the required averages that are commonly realized in digital signal processing applications, including time averages, ensemble averages, recursively estimated averages or moving (finite time) averages. The latter are of course suitable for online processing while the others are more appropriate for theoretical evaluations.

A distortion metric can be based on the correlations as follows $$D_k = |\gamma_k - \sqrt{\rho_0^{(1)} \rho_0^{(2)}} c_k|$$

where the sequence $\{c_k\}$ takes on predetermined target (auto-)correlation values. A useful prescription for the sequence $\{c_k\}$ is the delta sequence, which is a condition of zero 151.

Stochastic Adaptation

Figure 4:
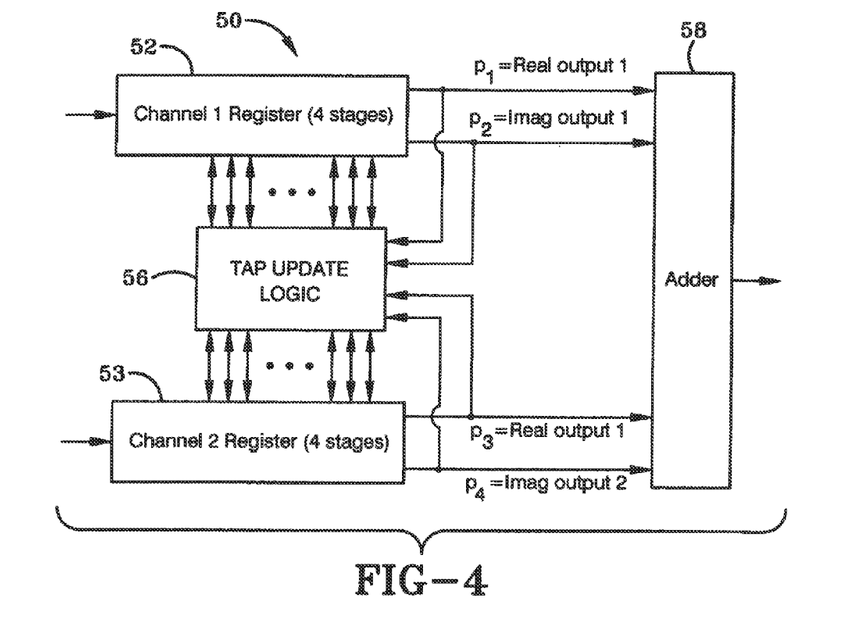
FIG. 4 is a schematic drawing illustrating an example system using 4 taps per branch.

FIG. 4 illustrates one example system 50 that performs multipath mitigation using 4 taps per branch. The system includes channel registers 52, 53, tap update logic 56 and an adder (diversity combiner). The tapped delay structure communicates with the tap update processor by making available the tap coefficients and the register contents (real and imaginary parts of each—thus, in the working example there are 16 data between each channel register and the processor).

The tap update process can be computed in 7 steps:
1. The vectors $\underline{I}$ and $\underline{Q}$ are formed by concatenating the real and imaginary vectors from the respective channels (this is an 8 element result)
2. The vector $[\underline{\Gamma} = \underline{I}^*(p_1 + p_4) + \underline{Q}^*(p_2 - p_3); \underline{I}(p_3 - p_2) + \underline{Q}^*(p_1 + p_4)]$ is formed (16 elements)
3. The quantity $q = (p_1)^2 + (p_2)^2 + (p_3)_2 + 2p_1 * p_4 - 2 * p_2 * p_3$ is computed
4. The vector $\underline{\Gamma}_T = \underline{\Gamma} - q * \underline{\gamma}$ is formed ($\underline{\gamma}$ is the current tap coefficient vector arranged as a 16 element array containing the real taps of channel 1, the real taps of channel 2, the imaginary taps of channel 1 and the imaginary taps of channel 2, in that order).
5. The vector $\underline{\Gamma}_r$ is normalized by diving by its length (norm), which is the square root of the sum of the squares. The square root can be approximate.
6. The taps are updated by the equation $\underline{\gamma} \to \underline{\gamma} + \epsilon \underline{\Gamma}_T$
7. The taps are normalized.

Figure 5:
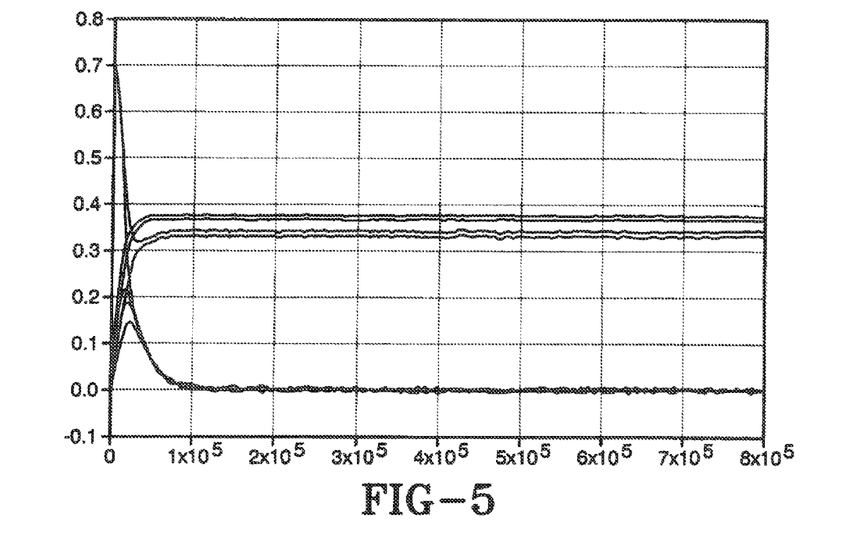
FIG. 5 is a graph illustrating the adoption of the tap coefficients in one embodiment of the system of FIG. 4.

FIG. 5 illustrates the adaptation of the tap coefficients.

Derivation of Algorithm Tap Update Equations

The respective inputs to the two filter arms are $I_1 + jQ_1$ and $I_2 + jQ_2$. The filter contents at time n are, in a delay line of L+1 stages, $$I_1 = \begin{bmatrix} I_1[n] \\ I_1[n-1] \\ I_1[n-2] \\ \vdots \\ I_1[n-L] \end{bmatrix} \quad Q_1 = \begin{bmatrix} Q_1[n] \\ Q_1[n-1] \\ Q_1[n-2] \\ \vdots \\ Q_1[n-L] \end{bmatrix}$$

$$I_2 = \begin{bmatrix} I_2[n] \\ I_2[n-1] \\ I_2[n-2] \\ \vdots \\ I_2[n-L] \end{bmatrix} \quad Q_2 = \begin{bmatrix} Q_2[n] \\ Q_2[n-1] \\ Q_2[n-2] \\ \vdots \\ Q_2[n-L] \end{bmatrix}$$

The taps weights are $$\underline{\alpha}_1 = \underline{\lambda}_1 + j\underline{\mu}_1$$

$$\underline{\alpha}_2 = \underline{\lambda}_2 + j\underline{\mu}_2$$

Define vectors $$\underline{\lambda} = \begin{bmatrix} \underline{\lambda}_1 \\ \underline{\lambda}_2 \end{bmatrix} \quad \underline{\mu} = \begin{bmatrix} \underline{\mu}_1 \\ \underline{\mu}_2 \end{bmatrix}$$

$$\underline{I} = \begin{bmatrix} \underline{I}_1 \\ \underline{I}_2 \end{bmatrix} \quad \underline{Q} = \begin{bmatrix} \underline{Q}_1 \\ \underline{Q}_2 \end{bmatrix}$$

The partial outputs are $$p_1 = \underline{\lambda}^T I$$

$$p_2 = \underline{\lambda}^T Q$$

$$p_3 = \underline{\mu}^T I$$

$$p_4 = \underline{\mu}^T Q$$

The composite (combined complex) output is $$y = (p_1 + p_4 + j(p_2 - p_3))$$

With this notation the weights are conjugated in the implementation so that the output of the respective filters can be written as dot products:

$$y_1 = \underline{\alpha}_1^* \underline{z}_1$$

$$y_2 = \underline{\alpha}_2^* \underline{z}_2$$

$$\underline{z}_1 = \underline{I}_1 + j\underline{Q}_1$$

$$\underline{z}_2 = \underline{I}_2 + j\underline{Q}_2$$

The total power in the output signal is $$P_s = \overline{|y|^2} = \overline{(p_1+p_4)^2} + \overline{(p_2-p_3)^2}$$

The stochastic gradient is $$\nabla_{\underline{\lambda}} = 2(p_1+p_4)\underline{I} + 2(p_2-p_3)\underline{Q}$$

$$\nabla_{\underline{\mu}} = 2(p_1+p_4)\underline{Q} + 2(p_2-p_3)\underline{I}$$

These vectors are used to drive the tap weights according to the following equation in which $\epsilon$ is a step size (gain) parameter that controls the speed of adaptation and the variance of the tap weights. Larger values of $\epsilon$ give faster adaptation and the ability to track a more rapidly varying channel while smaller values result in lower variation of the tap weights about the optimal values.

$$\lambda_{n+1} = \lambda_n + \epsilon \nabla_{\underline{\lambda}}$$

$$\mu_{n+1} = \mu_n + \epsilon \nabla_{\underline{\mu}}$$

The above equations are quite general. Any objective function for which the gradient may be computed, or approximated, may be used. In general, multiple objectives may be optimized by computing the respective gradients and combining them by a weighted addition. The weights may be chosen so as to give greater priority to certain objective functions, such as the SNR. Thus, the algorithm offers a great deal of flexibility to a system can be implemented.

An example of a useful auxiliary objective function is the lag correlations corresponding to lags of s samples where s is the number of samples between zeros of the baseband autocorrelation function. This objective function leads to minimized intersymbol interference in systems having zero autocorrelation at multiples of the baud interval, such as Nyquist pulsed systems. Thus, it is desired to minimizing lag-correlations, $|\rho_s|^2$. Then the appropriate gradients, as shown below will need to be calculated.

$$\rho_s = \overline{y[n]y[n+s]^*}$$
$$= \sigma + j\varphi$$
$$= \overline{[(p_1[n] + p_4[n]) + j(p_2[n] - p_3[n])]}$$
$$\overline{[(p_1[n+s] + p_4[n+s]) - j(p_2[n+s] - p_3[n+s])]}$$

$$\sigma = \overline{(p_1[n] + p_4[n])(p_1[n+s] + p_4[n+s])} +$$

-continued
$$\overline{(p_2[n] - p_3[n])(p_2[n+s] - p_3[n+s])}$$

$$\varphi = \overline{-(p_1[n] + p_4[n])(p_2[n+s] - p_3[n+s])} +$$
$$\overline{(p_2[n] - p_3[n])(p_1[n+s] + p_4[n+s])}$$

$$|\rho_s|^2 = |\sigma + j\varphi|^2 = \sigma^2 + \varphi^2$$

$$\nabla |\rho_s|^2 = 2\sigma \nabla \sigma + 2\varphi \nabla \varphi$$

The stochastic gradients are $$\nabla_{\underline{\lambda}} \sigma = (p_1[n] + p_4[n])\underline{I}[n+s] + (p_1[n+s] + p_4[n+s])$$
$$\underline{I}[n] + (p_2[n] - p_3[n])\underline{Q}[n+s] + (p_2[n+s] - p_3[n+s])$$
$$\underline{Q}[n]$$

$$\nabla_{\underline{\lambda}} \varphi = (p_1[n] + p_4[n])\underline{Q}[n+s] - (p_2[n+s] - p_3[n+s])$$
$$\underline{I}[n] + (p_2[n] - p_3[n])\underline{I}[n+s] + (p_1[n+s] + p_4[n+s])$$
$$\underline{Q}[n]$$

Extension of the Update Algorithm to Further Reduce Intersymbol Interference Effects The algorithm can be extended to drive additional metrics to desired values. The next metric will be the autocorrelation of the output, $y_n$. In particular, one can define the metric:

$$d_s = |\rho_1|^2 = |E\{y_n y_{n+s}^*\}|_2$$

which can be driven toward a minimum. Note that this is a zero-ISI condition at lag equal to s samples. Define the vectors:

$$x_n^{(1)} = \begin{bmatrix} x_n^{(1)} \\ x_{n-1}^{(1)} \\ \vdots \\ x_{n-L}^{(1)} \end{bmatrix} \quad x_n^{(2)} = \begin{bmatrix} x_n^{(2)} \\ x_{n-1}^{(2)} \\ \vdots \\ x_{n-L}^{(2)} \end{bmatrix}$$

comprising the current L+1 samples from the two sub-arrays at time n, and the conjugate tap vectors $$\underline{\alpha} = \begin{bmatrix} \alpha_0^* \\ \alpha_1^* \\ \vdots \\ \alpha_L^* \end{bmatrix} \quad \underline{\beta} = \begin{bmatrix} \beta_0^* \\ \beta_1^* \\ \vdots \\ \beta_L^* \end{bmatrix}$$

These are of course complex. It will prove to be useful to define the concatenation of the tap vectors, $$\underline{\sigma} = \begin{bmatrix} \underline{\alpha} \\ \underline{\beta} \end{bmatrix} = \underline{\sigma}_1 + j\underline{\sigma}_2$$

and the signal vectors, $$\underline{u}_n = \begin{bmatrix} \underline{x}^{(1)} \\ \underline{x}^{(2)} \end{bmatrix}$$

so that the output of the combiner is given as:

$$y_n = \underline{\sigma}^* \underline{u}_n$$

yields $$\rho_s = E\{y_n y_{n+s}^*\}$$
$$= \underline{\sigma}^* E\{u_n u_{n+s}^*\} \underline{\sigma}$$
$$= \underline{\sigma}^* \begin{bmatrix} R_s^{(1)} & C_s^{(12)} \\ C_s^{(21)} & R_s^{(2)} \end{bmatrix} \underline{\sigma}$$
$$= \underline{\sigma}^* M \underline{\sigma}$$
$$= \underline{\sigma}_1^* M \underline{\sigma}_1 + \underline{\sigma}_2^* M \underline{\sigma}_2 + j\underline{\sigma}_1^* M \underline{\sigma}_2 - j\underline{\sigma}_2^* M \underline{\sigma}_1$$

where one can identify $$M = \begin{bmatrix} R_s^{(1)} & C_s^{(12)} \\ C_s^{(21)} & R_s^{(2)} \end{bmatrix}$$

$$R_s^{(1)} = E\{\underline{x}_n^{(1)} \underline{x}_{n+s}^{(1)*}\}$$

$$R_s^{(2)} = E\{\underline{x}_n^{(2)} \underline{x}_{n+s}^{(2)*}\}$$

$$C_s^{(12)} = E\{\underline{x}_n^{(1)} \underline{x}_{n+s}^{(2)*}\}$$

$$C_s^{(21)} = E\{\underline{x}_n^{(2)} \underline{x}_{n+s}^{(1)*}\}$$

and note that $$R_s^{(1)} = R_{-s}^{(1)*}$$

$$R_s^{(2)} = R_{-s}^{(2)*}$$

$$C_s^{(12)} = C_{-s}^{(21)*}$$

One can calculate the gradient of $$d_s = |\rho_1|^2 = |E\{y_n y_{n+s}^*\}|^2$$

$$d_s = \operatorname{Re}\{\rho_s\}^2 + \operatorname{Im}\{\rho_s\}^2$$

$$\frac{\partial}{\partial \sigma_{1,i}} = 2\operatorname{Re}\{\rho_s\} \frac{\partial}{\partial \sigma_{1,i}} \operatorname{Re}\{\rho_s\} + 2\operatorname{Im}\{\rho_s\} \frac{\partial}{\partial \sigma_{1,i}} \operatorname{Im}\{\rho_s\}$$

$$\frac{\partial}{\partial \sigma_{2,i}} = 2\operatorname{Re}\{\rho_s\} \frac{\partial}{\partial \sigma_{2,i}} \operatorname{Re}\{\rho_s\} + 2\operatorname{Im}\{\rho_s\} \frac{\partial}{\partial \sigma_{2,i}} \operatorname{Im}\{\rho_s\}$$

The objective can be symmetrized since one knows $d_s = d_{-s}$ that $\operatorname{Im}\{\rho_{-s}\} = -\operatorname{Im}\{\rho_s\}$ and so it can be written:

$$\frac{\partial}{\partial \sigma_{1,i}} = \operatorname{Re}\{\rho_s\} \frac{\partial}{\partial \sigma_{1,i}} \operatorname{Re}\{\rho_s + \rho_{-s}\} + \operatorname{Im}\{\rho_s\} \frac{\partial}{\partial \sigma_{1,i}} \operatorname{Im}\{\rho_s - \rho_{-s}\}$$

$$\operatorname{Re}\{\rho_s\} = \operatorname{Re}\left\{\underline{\sigma}^* \begin{bmatrix} R_s^{(1)} & C_s^{(12)} \\ C_s^{(21)} & R_s^{(2)} \end{bmatrix} \underline{\sigma}\right\}$$

$$= \operatorname{Re}\left\{(\underline{\sigma}_1^* - j\underline{\sigma}_2^*) \begin{bmatrix} R_s^{(1)} & C_s^{(12)} \\ C_s^{(21)} & R_s^{(2)} \end{bmatrix} (\underline{\sigma}_1 + j\underline{\sigma}_2)\right\}$$

$$\operatorname{Im}\{\rho_s\} = \operatorname{Im}\left\{(\underline{\sigma}_1^* - j\underline{\sigma}_2^*) \begin{bmatrix} R_s^{(1)} & C_s^{(12)} \\ C_s^{(21)} & R_s^{(2)} \end{bmatrix} (\underline{\sigma}_1 + j\underline{\sigma}_2)\right\}$$

$$\frac{\partial}{\partial \sigma_{1,i}} \operatorname{Re}\{\rho_s\} = \operatorname{Re}\left\{\underline{e}_i^* \begin{bmatrix} R_s^{(1)} & C_s^{(12)} \\ C_s^{(21)} & R_s^{(2)} \end{bmatrix} (\underline{\sigma}_1 + j\underline{\sigma}_2) + \right.$$
$$\left. (\underline{\sigma}_1 + j\underline{\sigma}_2)^* \begin{bmatrix} R_s^{(1)} & C_s^{(12)} \\ C_s^{(21)} & R_s^{(2)} \end{bmatrix} \underline{e}_i\right\}$$

$$= \underline{e}_i^* \operatorname{Re}\left\{\begin{bmatrix} R_s^{(1)} & C_s^{(12)} \\ C_s^{(21)} & R_s^{(2)} \end{bmatrix} (\underline{\sigma}_1 + j\underline{\sigma}_2) + \right.$$
$$\left. \operatorname{conj}\begin{bmatrix} R_s^{(1)} & C_s^{(12)} \\ C_s^{(21)} & R_s^{(2)} \end{bmatrix}^* (\underline{\sigma}_1 - j\underline{\sigma}_2)\right\}$$

$$= \underline{e}_i^* \operatorname{Re}\left\{\begin{bmatrix} R_s^{(1)} & C_s^{(12)} \\ C_s^{(21)} & R_s^{(2)} \end{bmatrix} (\underline{\sigma}_1 + j\underline{\sigma}_2) + \right.$$
$$\left. \operatorname{conj}\begin{bmatrix} R_{-s}^{(1)} & C_{-s}^{(12)} \\ C_{-s}^{(21)} & R_{-s}^{(2)} \end{bmatrix} (\underline{\sigma}_1 - j\underline{\sigma}_2)\right\}$$

$$\frac{\partial}{\partial \sigma_{1,i}} \operatorname{Re}\{\rho_{-s}\} =$$
$$\underline{e}_i^* \operatorname{Re}\left\{\begin{bmatrix} R_{-s}^{(1)} & C_{-s}^{(12)} \\ C_{-s}^{(21)} & R_{-s}^{(2)} \end{bmatrix} (\underline{\sigma}_1 + j\underline{\sigma}_2) + \operatorname{conj}\begin{bmatrix} R_s^{(1)} & C_s^{(12)} \\ C_s^{(21)} & R_s^{(2)} \end{bmatrix} (\underline{\sigma}_1 - j\underline{\sigma}_2)\right\}$$

thus $$\frac{\partial}{\partial \sigma_{1,i}} \operatorname{Re}\{\rho_s + \rho_{-s}\} = \underline{e}_i^* \operatorname{Re}\left\{\begin{bmatrix} R_{-s}^{(1)} & C_{-s}^{(12)} \\ C_{-s}^{(21)} & R_{-s}^{(2)} \end{bmatrix} + \begin{bmatrix} R_s^{(1)} & C_s^{(12)} \\ C_s^{(21)} & R_s^{(2)} \end{bmatrix}\right\} \underline{\sigma}_1 -$$
$$\underline{e}_i^* \operatorname{Im}\left\{\begin{bmatrix} R_{-s}^{(1)} & C_{-s}^{(12)} \\ C_{-s}^{(21)} & R_{-s}^{(2)} \end{bmatrix} + \begin{bmatrix} R_s^{(1)} & C_s^{(12)} \\ C_s^{(21)} & R_s^{(2)} \end{bmatrix}\right\} \underline{\sigma}_2$$

$$= \underline{e}_i^* \operatorname{Re}\left\{\begin{bmatrix} R_s^{(1)*} & C_s^{(21)*} \\ C_s^{(12)*} & R_s^{(2)*} \end{bmatrix} + \begin{bmatrix} R_s^{(1)} & C_s^{(12)} \\ C_s^{(21)} & R_s^{(2)} \end{bmatrix}\right\} \underline{\sigma}_1 -$$
$$\underline{e}_i^* \operatorname{Im}\left\{\begin{bmatrix} R_s^{(1)*} & C_s^{(21)*} \\ C_s^{(12)*} & R_s^{(2)*} \end{bmatrix} + \begin{bmatrix} R_s^{(1)} & C_s^{(12)} \\ C_s^{(21)} & R_s^{(2)} \end{bmatrix}\right\} \underline{\sigma}_2$$

where the matrix $$\begin{bmatrix} R_s^{(1)*} & C_s^{(21)*} \\ C_s^{(12)*} & R_s^{(2)*} \end{bmatrix} + \begin{bmatrix} R_s^{(1)} & C_s^{(12)} \\ C_s^{(21)} & R_s^{(2)} \end{bmatrix}$$

appearing in the last sine is Hermitian. Similarly $$\frac{\partial}{\partial \sigma_{1,i}} \operatorname{Im}\{\rho_s\} = \operatorname{Im}\left\{\underline{e}_i^* \begin{bmatrix} R_s^{(1)} & C_s^{(12)} \\ C_s^{(21)} & R_s^{(2)} \end{bmatrix} (\underline{\sigma}_1 + j\underline{\sigma}_2) + \right.$$
$$\left. (\underline{\sigma}_1 + j\underline{\sigma}_2)^* \begin{bmatrix} R_s^{(1)} & C_s^{(12)} \\ C_s^{(21)} & R_s^{(2)} \end{bmatrix} \underline{e}_i\right\}$$

$$= \underline{e}_i^* \operatorname{Im}\left\{\begin{bmatrix} R_s^{(1)} & C_s^{(12)} \\ C_s^{(21)} & R_s^{(2)} \end{bmatrix} (\underline{\sigma}_1 + j\underline{\sigma}_2) + \right.$$
$$\left. \operatorname{conj}\begin{bmatrix} R_s^{(1)} & C_s^{(12)} \\ C_s^{(21)} & R_s^{(2)} \end{bmatrix}^* (\underline{\sigma}_1 - j\underline{\sigma}_2)\right\}$$

$$= \underline{e}_i^* \operatorname{Im}\left\{\begin{bmatrix} R_s^{(1)} & C_s^{(12)} \\ C_s^{(21)} & R_s^{(2)} \end{bmatrix} (\underline{\sigma}_1 + j\underline{\sigma}_2) + \right.$$
$$\left. \operatorname{conj}\begin{bmatrix} R_{-s}^{(1)} & C_{-s}^{(12)} \\ C_{-s}^{(21)} & R_{-s}^{(2)} \end{bmatrix} (\underline{\sigma}_1 - j\underline{\sigma}_2)\right\}$$

$$\frac{\partial}{\partial \sigma_{1,i}} \text{Im}\{\rho_{-s}\} =$$

$$\underline{e}_i^* \text{Im}\left\{\begin{bmatrix} R_{-s}^{(1)} & C_{-s}^{(12)} \\ C_{-s}^{(21)} & R_{-s}^{(2)} \end{bmatrix}(\underline{\sigma}_1 + j\underline{\sigma}_2) + conj\begin{bmatrix} R_s^{(1)} & C_s^{(12)} \\ C_s^{(21)} & R_s^{(2)} \end{bmatrix}(\underline{\sigma}_1 - j\underline{\sigma}_2)\right\}$$

thus $$\frac{\partial}{\partial \sigma_{1,i}} \text{Im}\{\rho_s - \rho_{-s}\} = \underline{e}_i^* \text{Im}\left\{\begin{bmatrix} R_s^{(1)} & C_s^{(12)} \\ C_s^{(21)} & R_s^{(2)} \end{bmatrix} - \begin{bmatrix} R_s^{(1)*} & C_s^{(21)*} \\ C_s^{(12)*} & R_s^{(2)*} \end{bmatrix}\right\}\underline{\sigma}_1 +$$

$$\underline{e}_i^* \text{Re}\left\{\begin{bmatrix} R_s^{(1)} & C_s^{(12)} \\ C_s^{(21)} & R_s^{(2)} \end{bmatrix} - \begin{bmatrix} R_s^{(1)*} & C_s^{(21)*} \\ C_s^{(12)*} & R_s^{(2)*} \end{bmatrix}\right\}\underline{\sigma}_2$$

where the matrix $$\begin{bmatrix} R_s^{(1)*} & C_s^{(21)*} \\ C_s^{(12)*} & R_s^{(2)*} \end{bmatrix} - \begin{bmatrix} R_s^{(1)} & C_s^{(12)} \\ C_s^{(21)} & R_s^{(2)} \end{bmatrix}$$

that appears is now skew Hermitian.
In a similar fashion it is computed $$\frac{\partial}{\partial \sigma_{2,i}} = \text{Re}\{\rho_s\}\frac{\partial}{\partial \sigma_{2,i}}\text{Re}\{\rho_s + \rho_{-s}\} + \text{Im}\{\rho_s\}\frac{\partial}{\partial \sigma_{2,i}}\text{Im}\{\rho_s - \rho_{-s}\}$$

$$\frac{\partial}{\partial \sigma_{2,i}}\text{Re}\{\rho_s\} = \frac{\partial}{\partial \sigma_{2,i}}\text{Re}\left\{(\underline{\sigma}_1^* - j\underline{\sigma}_2^*)\begin{bmatrix} R_s^{(1)} & C_s^{(12)} \\ C_s^{(21)} & R_s^{(2)} \end{bmatrix}(\underline{\sigma}_1 + j\underline{\sigma}_2)\right\}$$

$$= \text{Re}\left\{-j\underline{e}_i^*\begin{bmatrix} R_s^{(1)} & C_s^{(12)} \\ C_s^{(21)} & R_s^{(2)} \end{bmatrix}(\underline{\sigma}_1 + j\underline{\sigma}_2) + (\underline{\sigma}_1^* - j\underline{\sigma}_2^*)\begin{bmatrix} R_s^{(1)} & C_s^{(12)} \\ C_s^{(21)} & R_s^{(2)} \end{bmatrix}j\underline{e}_i\right\}$$

$$= \underline{e}_i^* \text{Re}\left\{-j\begin{bmatrix} R_s^{(1)} & C_s^{(12)} \\ C_s^{(21)} & R_s^{(2)} \end{bmatrix}(\underline{\sigma}_1 + j\underline{\sigma}_2) + conj\left\{(-j)\begin{bmatrix} R_s^{(1)} & C_s^{(12)} \\ C_s^{(21)} & R_s^{(2)} \end{bmatrix}^*(\underline{\sigma}_1 + j\underline{\sigma}_2)\right\}\right\}$$

$$= \underline{e}_i^* \text{Re}\left\{-j\begin{bmatrix} R_s^{(1)} & C_s^{(12)} \\ C_s^{(21)} & R_s^{(2)} \end{bmatrix}(\underline{\sigma}_1 + j\underline{\sigma}_2) + jconj\left\{\begin{bmatrix} R_s^{(1)} & C_s^{(12)} \\ C_s^{(21)} & R_s^{(2)} \end{bmatrix}^*(\underline{\sigma}_1 + j\underline{\sigma}_2)\right\}\right\}$$

$$= \underline{e}_i^* \text{Im}\left\{\begin{bmatrix} R_s^{(1)} & C_s^{(12)} \\ C_s^{(21)} & R_s^{(2)} \end{bmatrix}(\underline{\sigma}_1 + j\underline{\sigma}_2) - conj\begin{bmatrix} R_{-s}^{(1)} & C_{-s}^{(12)} \\ C_{-s}^{(21)} & R_{-s}^{(2)} \end{bmatrix}(\underline{\sigma}_1 - j\underline{\sigma}_2)\right\}$$

$$\frac{\partial}{\partial \sigma_{2,i}}\text{Re}\{\rho_{-s}\} =$$

$$\underline{e}_i^* \text{Im}\left\{\begin{bmatrix} R_{-s}^{(1)} & C_{-s}^{(12)} \\ C_{-s}^{(21)} & R_{-s}^{(2)} \end{bmatrix}(\underline{\sigma}_1 + j\underline{\sigma}_2) - conj\begin{bmatrix} R_s^{(1)} & C_s^{(12)} \\ C_s^{(21)} & R_s^{(2)} \end{bmatrix}(\underline{\sigma}_1 - j\underline{\sigma}_2)\right\}$$

thus $$\frac{\partial}{\partial \sigma_{2,i}}\text{Re}\{\rho_s + \rho_{-s}\} = \underline{e}_i^* \text{Im}\left\{\begin{bmatrix} R_{-s}^{(1)} & C_{-s}^{(12)} \\ C_{-s}^{(21)} & R_{-s}^{(2)} \end{bmatrix} + \begin{bmatrix} R_s^{(1)} & C_s^{(12)} \\ C_s^{(21)} & R_s^{(2)} \end{bmatrix}\right\}\underline{\sigma}_1 +$$

$$\underline{e}_i^* \text{Re}\left\{\begin{bmatrix} R_{-s}^{(1)} & C_{-s}^{(12)} \\ C_{-s}^{(21)} & R_{-s}^{(2)} \end{bmatrix} + \begin{bmatrix} R_s^{(1)} & C_s^{(12)} \\ C_s^{(21)} & R_s^{(2)} \end{bmatrix}\right\}\underline{\sigma}_2$$

$$= \underline{e}_i^* \text{Im}\left\{\begin{bmatrix} R_s^{(1)*} & C_s^{(21)*} \\ C_s^{(12)*} & R_s^{(2)*} \end{bmatrix} + \begin{bmatrix} R_s^{(1)} & C_s^{(12)} \\ C_s^{(21)} & R_s^{(2)} \end{bmatrix}\right\}\underline{\sigma}_1 +$$

$$\underline{e}_i^* \text{Re}\left\{\begin{bmatrix} R_s^{(1)*} & C_s^{(21)*} \\ C_s^{(12)*} & R_s^{(2)*} \end{bmatrix} + \begin{bmatrix} R_s^{(1)} & C_s^{(12)} \\ C_s^{(21)} & R_s^{(2)} \end{bmatrix}\right\}\underline{\sigma}_2$$

and $$\frac{\partial}{\partial \sigma_{2,i}}\text{Im}\{\rho_s\} = \frac{\partial}{\partial \sigma_{2,i}}\text{Im}\left\{(\underline{\sigma}_1^* - j\underline{\sigma}_2^*)\begin{bmatrix} R_s^{(1)} & C_s^{(12)} \\ C_s^{(21)} & R_s^{(2)} \end{bmatrix}(\underline{\sigma}_1 + j\underline{\sigma}_2)\right\}$$

$$= \text{Im}\left\{-j\underline{e}_i^*\begin{bmatrix} R_s^{(1)} & C_s^{(12)} \\ C_s^{(21)} & R_s^{(2)} \end{bmatrix}(\underline{\sigma}_1 + j\underline{\sigma}_2) + (\underline{\sigma}_1^* - j\underline{\sigma}_2^*)\begin{bmatrix} R_s^{(1)} & C_s^{(12)} \\ C_s^{(21)} & R_s^{(2)} \end{bmatrix}j\underline{e}_i\right\}$$

$$= \underline{e}_i^* \text{Im}\left\{-j\begin{bmatrix} R_s^{(1)} & C_s^{(12)} \\ C_s^{(21)} & R_s^{(2)} \end{bmatrix}(\underline{\sigma}_1 + j\underline{\sigma}_2) + conj\left\{(-j)\begin{bmatrix} R_s^{(1)} & C_s^{(12)} \\ C_s^{(21)} & R_s^{(2)} \end{bmatrix}^*(\underline{\sigma}_1 + j\underline{\sigma}_2)\right\}\right\}$$

$$= \underline{e}_i^* \text{Im}\left\{-j\begin{bmatrix} R_s^{(1)} & C_s^{(12)} \\ C_s^{(21)} & R_s^{(2)} \end{bmatrix}(\underline{\sigma}_1 + j\underline{\sigma}_2) + jconj\left\{\begin{bmatrix} R_s^{(1)} & C_s^{(12)} \\ C_s^{(21)} & R_s^{(2)} \end{bmatrix}^*(\underline{\sigma}_1 + j\underline{\sigma}_2)\right\}\right\}$$

$$= \underline{e}_i^* \text{Re}\left\{-\begin{bmatrix} R_s^{(1)} & C_s^{(12)} \\ C_s^{(21)} & R_s^{(2)} \end{bmatrix}(\underline{\sigma}_1 + j\underline{\sigma}_2) + conj\begin{bmatrix} R_{-s}^{(1)} & C_{-s}^{(12)} \\ C_{-s}^{(21)} & R_{-s}^{(2)} \end{bmatrix}(\underline{\sigma}_1 - j\underline{\sigma}_2)\right\}$$

$$\frac{\partial}{\partial \sigma_{2,i}}\text{Im}\{\rho_{-s}\} =$$

$$\underline{e}_i^* \text{Re}\left\{-\begin{bmatrix} R_{-s}^{(1)} & C_{-s}^{(12)} \\ C_{-s}^{(21)} & R_{-s}^{(2)} \end{bmatrix}(\underline{\sigma}_1 + j\underline{\sigma}_2) + conj\begin{bmatrix} R_s^{(1)} & C_s^{(12)} \\ C_s^{(21)} & R_s^{(2)} \end{bmatrix}(\underline{\sigma}_1 - j\underline{\sigma}_2)\right\}$$

thus $$\frac{\partial}{\partial \sigma_{2,i}}\text{Im}\{\rho_s - \rho_{-s}\} = -\underline{e}_i^* \text{Re}\left\{\begin{bmatrix} R_s^{(1)} & C_s^{(12)} \\ C_s^{(21)} & R_s^{(2)} \end{bmatrix} - \begin{bmatrix} R_{-s}^{(1)} & C_{-s}^{(12)} \\ C_{-s}^{(21)} & R_{-s}^{(2)} \end{bmatrix}\right\}\underline{\sigma}_1 +$$

$$\underline{e}_i^* \text{Im}\left\{\begin{bmatrix} R_s^{(1)} & C_s^{(12)} \\ C_s^{(21)} & R_s^{(2)} \end{bmatrix} - \begin{bmatrix} R_{-s}^{(1)} & C_{-s}^{(12)} \\ C_{-s}^{(21)} & R_{-s}^{(2)} \end{bmatrix}\right\}\underline{\sigma}_2$$

$$= -\underline{e}_i^* \text{Re}\left\{\begin{bmatrix} R_s^{(1)} & C_s^{(12)} \\ C_s^{(21)} & R_s^{(2)} \end{bmatrix} - \begin{bmatrix} R_s^{(1)*} & C_s^{(21)*} \\ C_s^{(12)*} & R_s^{(2)*} \end{bmatrix}\right\}\underline{\sigma}_1 +$$

$$\underline{e}_i^* \text{Im}\left\{\begin{bmatrix} R_s^{(1)} & C_s^{(12)} \\ C_s^{(21)} & R_s^{(2)} \end{bmatrix} - \begin{bmatrix} R_s^{(1)*} & C_s^{(21)*} \\ C_s^{(12)*} & R_s^{(2)*} \end{bmatrix}\right\}\underline{\sigma}_2$$

-continued

Let $\rho_s = \lambda + j\mu$ $H = M + M^*$ $S = M - M^*$

Then from all of the above data we can write $$\frac{\partial}{\partial \sigma_{1,i}} = \text{Re}\{\rho_s\}\frac{\partial}{\partial \sigma_{1,i}}\text{Re}\{\rho_s + \rho_{-s}\} + \text{Im}\{\rho_s\}\frac{\partial}{\partial \sigma_{1,i}}\text{Im}\{\rho_s - \rho_{-s}\}$$
$$= \lambda\text{Re}\{H\}\underline{\sigma}_1 - \lambda\text{Im}\{H\}\underline{\sigma}_2 + \mu\text{Im}\{S\}\underline{\sigma}_1 + \mu\text{Re}\{S\}\underline{\sigma}_2$$

$$\frac{\partial}{\partial \sigma_{2,i}} = \lambda\text{Im}\{H\}\underline{\sigma}_1 + \lambda\text{Re}\{H\}\underline{\sigma}_2 - \mu\text{Re}\{S\}\underline{\sigma}_1 + \mu\text{Im}\{S\}\underline{\sigma}_2$$

The complex gradient is then $$\nabla_{\sigma_1} + j\nabla_{\sigma_2} = \lambda H\underline{\sigma}_1 + \mu S\underline{\sigma}_2 + [(j\lambda)j\text{Im}\{H\}\underline{\sigma}_2 +$$
$$(j\lambda)\text{Re}\{H\}\underline{\sigma}_2] - [(j\mu)j\text{Im}\{S\}\underline{\sigma}_1 + (j\mu)\text{Re}\{S\}\underline{\sigma}_1]$$
$$= \lambda H\underline{\sigma}_1 + \mu S\underline{\sigma}_2 + j\lambda H\underline{\sigma}_2 - j\mu S\underline{\sigma}_1$$
$$= \lambda H(\underline{\sigma}_1 + j\underline{\sigma}_2) - j\mu S(\underline{\sigma}_1 + j\underline{\sigma}_2)$$
$$= (\lambda H - j\mu S)(\underline{\sigma}_1 + j\underline{\sigma}_2)$$
$$= [(\lambda - j\mu)M + (\lambda + j\mu)M^*]\underline{\sigma}$$

$\nabla_{\underline{\sigma}_1} = \text{Re}\{\lambda H\underline{\sigma}\} - \text{Re}\{j\mu S\underline{\sigma}\}$
$= \text{Re}\{\lambda H\underline{\sigma}\} + \text{Im}\{\mu S\underline{\sigma}\}$ $\nabla_{\underline{\sigma}_2} = \text{Im}\{\lambda H\underline{\sigma}\} - \text{Im}\{j\mu S\underline{\sigma}\}$
$= \text{Im}\{\lambda H\underline{\sigma}\} - \text{Re}\{\mu S\underline{\sigma}\}$ Returning to $\rho_s = E\{y_n y_{n+s}^*\}$
$= \underline{\sigma}^* E\{\underline{u}_n \underline{u}_{n+s}^*\}\underline{\sigma}$
$= \underline{\sigma}^* \begin{bmatrix} R_s^{(1)} & C_s^{(12)} \\ C_s^{(21)} & R_s^{(2)} \end{bmatrix} \underline{\sigma}$
$= \underline{\sigma}^* M \underline{\sigma}$
$= \underline{\sigma}_1^* M \underline{\sigma}_1 + \underline{\sigma}_2^* M \underline{\sigma}_2 + j\underline{\sigma}_1^* M \underline{\sigma}_2 - j\underline{\sigma}_2^* M \underline{\sigma}_1$
$= \underline{\sigma}_1^* M \underline{\sigma}_1 + \underline{\sigma}_2^* M \underline{\sigma}_2 + j\underline{\sigma}_1^* M \underline{\sigma}_2 - j\text{conj}\{\underline{\sigma}_1^* M^* \underline{\sigma}_2\}$ $2\lambda = \underline{\sigma}_1^* H \underline{\sigma}_1 + \underline{\sigma}_2^* H \underline{\sigma}_2 + \underline{\sigma}_1^* 2\text{Re}\{j(M - \text{conj}\{M^*\})\}\underline{\sigma}_2$
$= \underline{\sigma}_1^* H \underline{\sigma}_1 + \underline{\sigma}_2^* H \underline{\sigma}_2 - \underline{\sigma}_1^* 2\text{Im}(M + M^*)\underline{\sigma}_2$
$= \underline{\sigma}_1^* H \underline{\sigma}_1 + \underline{\sigma}_2^* H \underline{\sigma}_2 - \underline{\sigma}_1^* 2\text{Im}\{H\}\underline{\sigma}_2$ $2j\mu = \underline{\sigma}_1^* S \underline{\sigma}_1 + \underline{\sigma}_2^* S \underline{\sigma}_2 + j\underline{\sigma}_1^* 2\text{Re}\{(M - \text{conj}\{M^*\})\}\underline{\sigma}_2$
$= \underline{\sigma}_1^* S \underline{\sigma}_1 + \underline{\sigma}_2^* S \underline{\sigma}_2 + j\underline{\sigma}_1^* 2\text{Re}(M - M^*)\underline{\sigma}_2$
$= \underline{\sigma}_1^* S \underline{\sigma}_1 + \underline{\sigma}_2^* S \underline{\sigma}_2 + j\underline{\sigma}_1^* 2\text{Re}\{S\}\underline{\sigma}_2$ Let us compute $\frac{\partial \rho_s}{\partial \sigma_{1,i}} = \underline{e}_i^* M \underline{\sigma}_1 + \underline{\sigma}_1^* M \underline{e}_i + j\underline{e}_i^* M \underline{\sigma}_2 - j\underline{\sigma}_2^* M \underline{e}_i$
$= \underline{e}_i^* M \underline{\sigma}_1 + \text{conj}\{\underline{e}_i^* M^* \underline{\sigma}_1\} + j\underline{e}_i^* M \underline{\sigma}_2 + \text{conj}\{j\underline{e}_i^* M^* \underline{\sigma}_2\}$
$= \underline{e}_i^* M(\underline{\sigma}_1 + j\underline{\sigma}_2) + \text{conj}\{\underline{e}_i^* M^*(\underline{\sigma}_1 + j\underline{\sigma}_2)\}$ $\frac{\partial \rho_s^*}{\partial \sigma_{1,i}} = \underline{e}_i^* M^*(\underline{\sigma}_1 + j\underline{\sigma}_2) + \text{conj}\{\underline{e}_i^* M(\underline{\sigma}_1 + j\underline{\sigma}_2)\}$ Thus $\frac{\partial \lambda}{\partial \sigma_{1,i}} = 2\text{Re}\{\underline{e}_i^* H\underline{\sigma}\}$ $\frac{\partial \mu}{\partial \sigma_{1,i}} = 2\text{Im}\{\underline{e}_i^* S\underline{\sigma}\}$
$= \underline{\sigma}_1^* M \underline{\sigma}_1 + \underline{\sigma}_2^* M \underline{\sigma}_2 + j\underline{\sigma}_1^* M \underline{\sigma}_2 - j\underline{\sigma}_2^* M \underline{\sigma}_1$ Similarly $\frac{\partial \rho_s}{\partial \sigma_{2,i}} = \underline{e}_i^* M \underline{\sigma}_2 + \underline{\sigma}_2^* M \underline{e}_i - j\underline{e}_i^* M \underline{\sigma}_1 + j\underline{\sigma}_2^* M \underline{e}_i$
$= \underline{e}_i^* M \underline{\sigma}_2 + \text{conj}\{\underline{e}_i^* M^* \underline{\sigma}_2\} - j\underline{e}_i^* M \underline{\sigma}_1 + \text{conj}\{j\underline{e}_i^* M^* \underline{\sigma}_1\}$
$= -j\underline{e}_i^* M(\underline{\sigma}_1 + j\underline{\sigma}_2) + \text{conj}\{-j\underline{e}_i^* M^*(\underline{\sigma}_1 + j\underline{\sigma}_2)\}$ $\frac{\partial \rho_s^*}{\partial \sigma_{2,i}} = -j\underline{e}_i^* M^*(\underline{\sigma}_1 + j\underline{\sigma}_2) + \text{conj}\{-j\underline{e}_i^* M(\underline{\sigma}_1 + j\underline{\sigma}_2)\}$ so that $\frac{\partial \lambda}{\partial \sigma_{2,i}} = 2\text{Im}\{\underline{e}_i^* H\underline{\sigma}\}$ $\frac{\partial \mu}{\partial \sigma_{2,i}} = -2\text{Re}\{\underline{e}_i^* S\underline{\sigma}\}$ Hessian $\nabla_{\underline{\sigma}_1} = \text{Re}\{\lambda H\underline{\sigma}\} - \text{Re}\{j\mu S\underline{\sigma}\}$
$= \text{Re}\{\lambda H\underline{\sigma}\} + \text{Im}\{\mu S\underline{\sigma}\}$ $\nabla_{\underline{\sigma}_2} = \text{Im}\{\lambda H\underline{\sigma}\} - \text{Im}\{j\mu S\underline{\sigma}\}$
$= \text{Im}\{\lambda H\underline{\sigma}\} - \text{Re}\{\mu S\underline{\sigma}\}$ $J = \frac{\partial^2 d_s}{\partial \sigma_b \partial \sigma_a}$
$= \frac{\partial \lambda}{\partial \sigma_b}\text{Re}\{\underline{e}_a^* H\underline{\sigma}\} + \lambda\text{Re}\{\underline{e}_a^* H\underline{e}_b\} + \frac{\partial \mu}{\partial \sigma_b}\text{Im}\{\underline{e}_a^* S\underline{\sigma}\} + \mu\text{Im}\{\underline{e}_a^* S\underline{e}_b\}$ $\frac{\partial}{\partial \sigma_{1,i}}\rho_s = \underline{e}_i^* \begin{bmatrix} R_s^{(1)} & C_s^{(12)} \\ C_s^{(21)} & R_s^{(2)} \end{bmatrix}(\underline{\sigma}_1 + j\underline{\sigma}_2) +$ $(\underline{\sigma}_1 + j\underline{\sigma}_2)^* \begin{bmatrix} R_s^{(1)} & C_s^{(12)} \\ C_s^{(21)} & R_s^{(2)} \end{bmatrix} \underline{e}_i$ $= \underline{e}_i^* \left( \begin{bmatrix} R_s^{(1)} & C_s^{(12)} \\ C_s^{(21)} & R_s^{(2)} \end{bmatrix}(\underline{\sigma}_1 + j\underline{\sigma}_2) + \text{conj} \right.$ $\left. \begin{bmatrix} R_s^{(1)} & C_s^{(12)} \\ C_s^{(21)} & R_s^{(2)} \end{bmatrix}^* \text{conj}(\underline{\sigma}_1 + j\underline{\sigma}_2) \right)$ $= \underline{e}_i^* \left( \begin{bmatrix} R_s^{(1)} & C_s^{(12)} \\ C_s^{(21)} & R_s^{(2)} \end{bmatrix}(\underline{\sigma}_1 + j\underline{\sigma}_2) + \right.$ $\left. \begin{bmatrix} R_s^{(1)T} & C_s^{(21)T} \\ C_s^{(12)T} & R_s^{(2)T} \end{bmatrix}(\underline{\sigma}_1 - j\underline{\sigma}_2) \right)$ The preferred embodiment of the invention contains several useful features and components. For example, the plurality of received branch outputs, such as antenna outputs, are independently detected by radio frequency processing means including filters, amplifiers frequency converters and analog to digital converters, to produce a digital baseband (I and Q) sample stream for each branch. Aspects of the preferred embodiment may be implemented using digital signal processing (DSP) techniques, however, it should be understood that such processing may be realized in various ways, including equivalent analog processing. The two or more receiving path outputs can be connected to a channel estimation and combiner optimization algorithm that adaptively determines suitable branch weights to be applied to the respective branches in a linear weighted combining process. The algorithm adapts the weights according to an objective function, usually the SNR of the combined output. The adaptation in the preferred embodiment is controlled by a stochastic gradient which is computed (updated) at regular intervals. In the preferred embodiment, the algorithm operates without knowledge of the signal data and requires no demodulation or decoding of the signal, nor is a training interval or sequence required. Thus, the algorithm is able to operate as a "blind" adaptive algorithm.

Additionally, the algorithm allows the speed of adaptation, the update rate and the variance of the estimated weights to be balanced by adjusting a parameter of the stochastic gradient algorithm, namely, the step size parameter. The algorithm may be applied, in one embodiment, as a simple SNR maximizing algorithm that is scalable to any number of branches. The algorithm and system may also be extended, by incorporation of additional objective functions, such as a measure of intersymbol interference (ISI), so that it further adapts to dispersion effects (frequency selective fading induced by differential delay of multipath components) in addition to fading effects. The additional processing to mitigate such dispersion effects includes an adaptive filter for each branch. The filter may be realized as a transversal filter with "taps" that are spaced in time by a suitable sample interval and which are further provided with adjustable weights, or gains, generally complex (that is, having amplitude and phase adjustment capability), that are adaptively computed by the channel estimation and combiner optimization algorithm. When the algorithm is extended to measure ISI, the resulting improvement to the signal quality includes a reduction in intersymbol interference that further increases the quality of the symbol "eye pattern".

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
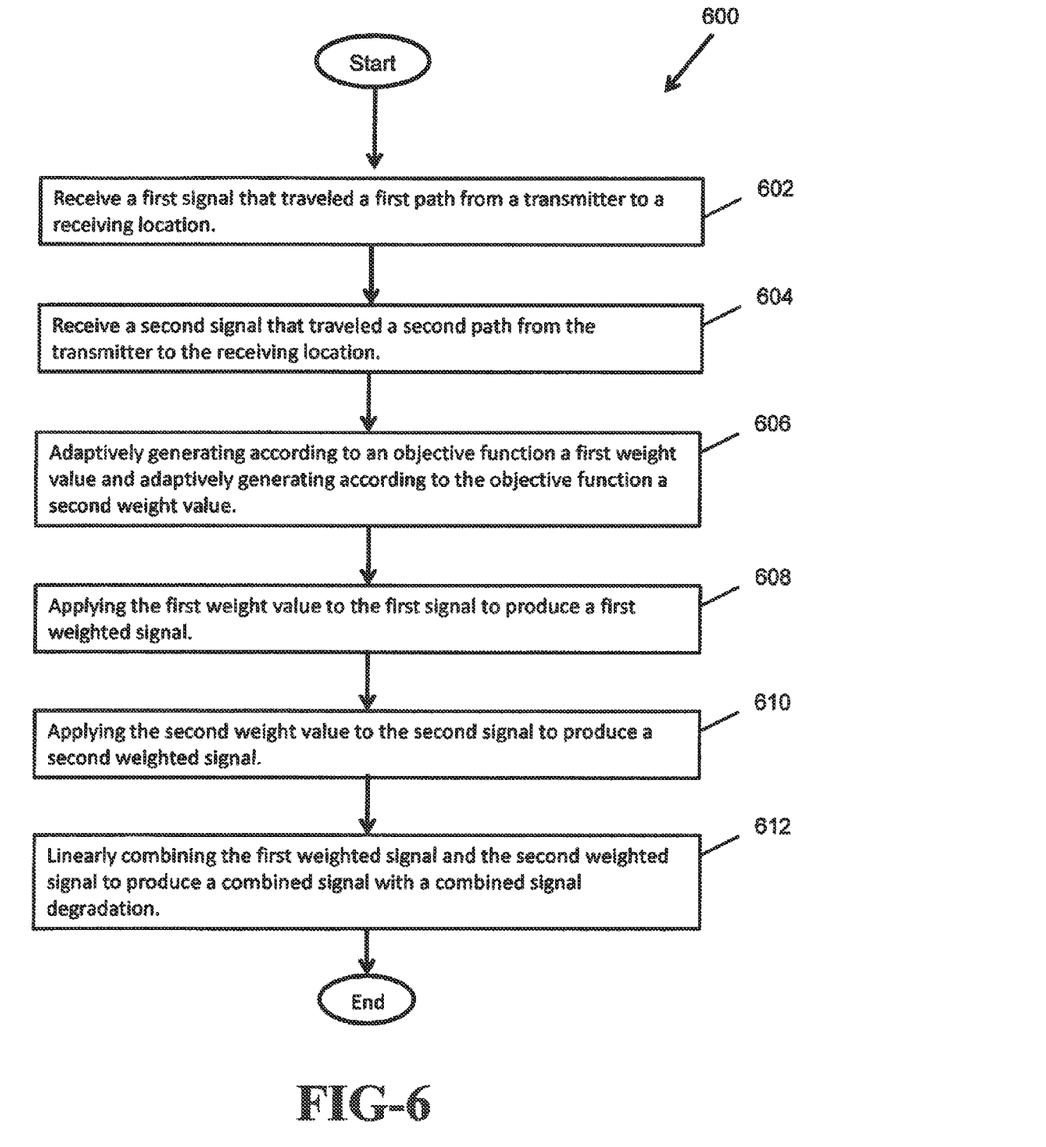
FIG. 6 illustrates a preferred embodiment of a method for optimally combining multi-path signals.

FIG. 6 illustrates a method 600 for optimally combining multi-path signals. The method 600 begins by receiving a first signal, at 602, that traveled a first path from a transmitter to a receiving location and receiving, at 604, a second signal that traveled a second path from the transmitter to the same receiving location. The second path is different than the first path so that the first signal contains signal data and has a first distortion that is different than a second distortion in the second signal. The second signal contains the same signal data as the first signal. The first distortion and the second distortion can correspond to different time intervals or other parameters.

According to an objective function, the method adaptively generates a first weight value and a second weight value, at 606. The first weight value the second weight value can be generated so that a combined signal to noise ratio (SNR) of the combined signal (introduced below) is maximized. The first weight value is applied to the first signal, at 608, to produce a first weighted signal. Similarly, the second weight value is applied to the second signal, at 610, to produce a second weighted signal.

The first weighted signal and the second weighted signal are linearly combined, at 612, to produce a combined signal with a combined signal degradation. The combined signal degradation is less than the first degradation and the combined signal degradation is less than the second degradation.

In another embodiment the method 600 can adaptively generate a third weight value and a fourth weight value so that an intersymbol interference ratio (ISI) is minimized. The third weight value is applied to the first signal and the fourth weight value is applied to the second signal. The third weight value can also be applied to the first signal after time domain filtering the first signal and the fourth weight value can also be applied to the second signal after time domain filtering the second signal.

In one implementation, the method 600 can enforce various constraints. For example, the method 600 can constrain the first weight value and constrain the second the second weight value so that at least one parameter of the combined signal is optimized. These constraints can ensure that a noise power of the combined signal is held below a threshold value. The constrains can be based, at least in part, by the norm of a weighted vector. The norm of the weighted vector can be held to a constant value. The constant value can be a noise value and the objective function can have a goal of maximizing the power of the combined signal.

Other embodiments of the method 600 may perform other useful actions and contain other features. For example, the method could constrain the first weight value and the second weight value so the that the sum of the square of the first weight value plus the sum of the square of the second weight value is a constant. The first weight value and the second weight value can be periodically updated based, at least in part, on the constant. The objective function is based, at least in part, on a stochastic gradient value. The method 600 can use an objective function that does not require training over a sequence of values nor a demodulation of the combined signal to extract information in the combined signal.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method for optimally combining multi-path signals comprising:
   receiving a first signal that traveled a first path from a transmitter to a receiving location, wherein the first signal contains signal data and has a first distortion;
   receiving a second signal that traveled a second path from the transmitter to the receiving location, wherein the second path is different than the first path, and wherein the second signal contains the same signal data and has a second distortion that is different than the first distortion;
   maintaining noise power from the first and second distortions constant;
   adaptively generating according to an objective function a first weight value prior to a filter and adaptively generating according to the objective function a second weight value prior to the filter;
   applying the first weight value to the first signal to produce a first weighted signal with a first degradation;
   applying the second weight value to the second signal to produce a second weighted signal with a second degradation;
   running a stochastic adaption algorithm based on a set of norms that are defined independently from the first and second weighted signals;
   linearly combining the first weighted signal and the second weighted signal to produce a combined signal with a combined signal degradation to increase the combined signal in a combined signal to noise ratio (SNR), wherein the combined signal degradation is less than the first degradation and the combined signal degradation is less than the second degradation; and
   driving the first and second weighted signals towards a match by minimizing a value of the first weighted signal less the second weighted signal.

2. The method of claim 1 further comprising:
   constraining the first weight value and the second weight value so the that the sum of the square of the first weight value plus the sum of the square of the second weight value is a constant; and
   periodically updating the first weight value and the second weight value based, at least in part, on the constant and the objective function.

3. The method of claim 1 wherein the step of adaptively generating further comprises:
   adaptively generating the first weight value and the second weight value so that the combined SNR of the combined signal is maximized; and
   matching spectral characteristics of the first weighted signal to nominal characteristics of the first signal; and
   matching spectral characteristics of the second weighted signal to nominal characteristics of the second signal.

4. The method of claim 3 wherein the step of adaptively generating further comprises:
   defining a first autocorrelation and a second autocorrelation;
   averaging the first and second autocorrelations;
   defining a first cross-correlation;
   averaging the first cross-correlation;
   adaptively generating a third weight value and a fourth weight value so that an intersymbol interference ratio (ISI) is minimized;
   applying the third weight value to the first signal; and
   applying the fourth weight value to the second signal;
   wherein the filter is an adaptive filter and the objective function adapts to dispersion effects and fading effects and mitigates the dispersion effects with the adaptive filter.

5. The method of claim 4 further comprising:
   applying the third weight value to the first signal after time domain filtering the first signal; and
   applying the fourth weight value to the second signal after time domain filtering the second signal.

6. The method of claim 4 wherein the step of adaptively generating the third weight value and the fourth weight value further comprises:
   adaptively generating the third weight value and the fourth weight value so that a combined signal to noise ratio (SNR) of the combined signal is maximized.

7. The method of claim 4 wherein the objective function is based, at least in part, on a stochastic gradient value, and the step of running the stochastic adaption algorithm further comprises the steps of:
   implementing the stochastic adaption algorithm without knowledge of the signal data and requiring no demodulation of the signal data and no decoding of the signal data;
   adjusting a parameter of the stochastic gradient value to balance an update rate and a variance of estimated weight values.

8. The method of claim 1 further comprising:
   constraining the first weight value and constraining the second weight value so that at least one parameter of the combined signal is optimized; and
   wherein the filter is a transversal filter including taps spaced in time by a sample interval having adjustable gains adaptively computed by a channel estimation and combination optimization algorithm.

9. The method of claim 1 further comprising:
   constraining the first weight value and constraining the second weight value so that a noise power of the combined signal is held below a threshold value.

10. The method of claim 1 further comprising:
    periodically updating the first weight value and the second weight value at a periodic time interval.

11. The method of claim 1 wherein the step of adaptively generating according to an objective function does not require any of the group of: training over a sequence of values and demodulation of the combined signal to extract information in the combined signal.

12. The method of claim 1 further comprising:
    constraining the first weight value is based, at least in part, by a norm of a weighted vector.

13. The method of claim 12 wherein the norm of the weighted vector is held to a constant value.

14. The method of claim 13 wherein the constant value is a noise value, and wherein the objective function has a goal of maximizing the power of the combined signal.

15. The method of claim 1 wherein the first distortion and the second distortion correspond to different time intervals.

16. A system for optimally combining multi-path signals from a transmitter comprising:
    a first channel sub-processor logic configured to receive a first signal that traveled a first path from the transmitter to the first channel sub-processor, wherein the first signal contains signal data and has a first distortion;
    a second channel sub-processor logic configured to receive a second signal that traveled a second path from the same transmitter to the first channel sub-processor, wherein the second path is different than the first path, and wherein the second signal contains the same signal data and has a second distortion that is different than the first distortion;

an objective function;

a combiner including adaption and combining logic configured to adaptively generate according to the objective function a first weight value and adaptively generate according to the objective function a second weight value;

wherein the first channel sub-processor logic is configured to apply the first weight value to the first signal to produce a first weighted signal, wherein the second channel sub-processor logic is configured to apply the second weight value to the second signal to produce a second weighted signal, wherein the adaption and combining logic is configured to linearly combine the first weight signal and the second weighted signal to produce a combined signal with a combined signal degradation to increase the combined signal in a combined signal to noise ratio (SNR), wherein the combined signal degradation is less than the first degradation and the combined signal degradation is less than the second degradation; and wherein noise power from the first and second distortions are maintained constant; and adaption logic running a stochastic adaption algorithm based on a set of norms that are defined independently from the first and second weighted signals to adapt weights applied to the first and second signal according to an objective function and drive the first and second weighted signals towards a match by minimizing a value of the first weighted signal less the second weighted signal.

17. The system of claim 16 wherein the first channel sub-processor logic further comprises:

a first time domain filter configured to filter the first weighted signal before the first weight signal and the second weighted signal are combined to produce the combined signal; and wherein the first channel sub-processor logic further comprises:

a second time domain filter configured to filter the second weighted signal before the first weight signal and the second weighted signal are combined to produce the combined signal.

18. The system of claim 17 wherein the first time domain filter further comprises:

a first adjustable tap coefficient configured to reduce signal distortions in the first weighted signal before the first weight signal and the second weighted signal are combined to produce a combined signal; and wherein the second time domain filter further comprises:

a second adjustable tap coefficient configured to reduce signal distortions in the first weighted signal before the first weight signal and the second weighted signal are combined to produce a combined signal.

19. The system of claim 18 in which the first time domain filter and the second time domain filter are configured to align the first multiplied signal and the second multiplied signal to compensate for differences in delay between the first multiplied signal and the second multiplied signal.

20. The system of claim 18 wherein the adaption and combining logic is configured to adaptively generate according to the objective function the first weight value and the second weight value base, at least in part, on one or more of the group of: the first weighted signal, the second weighted signal, the combined signal, the first tap coefficient and the second tap coefficient.

21. The method for optimally combining multi-path signals of claim 1 wherein the combined signals are from a single transmitter.

22. The method of claim 1, wherein the step of running the stochastic adaption algorithm further comprises the steps of:

forming a first vector I and a second vector Q from concatenating a real and an imaginary vectors from respective first and second channels;

forming a third vector $\Gamma$, wherein $\Gamma$ is $\Gamma=I^*(p1+p4)+Q^*(p2-p3)$; $I^*(p3-p2)+Q^*(p1+p4)$, and p1 is a first tap, p2 is a second tap, p3 is a third tap, and p4 is a fourth tap;

computing a quantity q, wherein q is $q=(p1)^2+(p2)^2+(p3)^2+(p4)^2+(2^*p1^*p4)-(2^*p2^*p3)$;

forming a fourth vector $\Gamma_T$, wherein $\Gamma_T$ is $\Gamma_T=\Gamma-q^*\gamma$, and wherein $\gamma$ is a current tap coefficient vector arranged as a 16 element array containing a plurality of real taps of the first channel, a plurality real taps of the second channel, a plurality of imaginary taps of the first channel, and a plurality of imaginary taps of the second channel;

normalizing the fourth vector $\Gamma_T$ by dividing by its length (norm); and normalizing the first tap, the second tap, the third tap, and the fourth tap by $\gamma \to \gamma+\epsilon\Gamma_T$, wherein $\epsilon$ is a step size gain parameter controlling an adaption speed and a variance of the tap weights, wherein as $\epsilon$ increases so does the adaption speed and the speed of tracking a varying channel.

* * * * *